United States Patent
Lin et al.

(10) Patent No.: US 12,118,189 B2
(45) Date of Patent: Oct. 15, 2024

(54) METHOD AND APPARATUS FOR DISPLAYING ACTIVITY ENTRANCE, ELECTRONIC DEVICE AND STORAGE MEDIUM

(71) Applicant: Beijing Bytedance Network Technology Co., Ltd., Beijing (CN)

(72) Inventors: Meijuan Lin, Beijing (CN); Fengbo Yuan, Beijing (CN); Zifeng Zhao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/066,252

(22) Filed: Dec. 14, 2022

(65) Prior Publication Data

US 2023/0124461 A1    Apr. 20, 2023

Related U.S. Application Data

(63) Continuation of application No. PCT/CN2021/098532, filed on Jun. 7, 2021.

(30) Foreign Application Priority Data

Jun. 15, 2020    (CN) .......................... 202010546666.2

(51) Int. Cl.
  *G06F 3/0484*    (2022.01)
  *G06F 3/0481*    (2022.01)
  *H04N 21/414*    (2011.01)

(52) U.S. Cl.
  CPC .......... *G06F 3/0484* (2013.01); *G06F 3/0481* (2013.01); *H04N 21/41407* (2013.01)

(58) Field of Classification Search
  None
  See application file for complete search history.

(56) References Cited

U.S. PATENT DOCUMENTS 11,593,826 B1 *  2/2023  Chen ..................... H04L 67/141
2006/0010397 A1 *  1/2006  Laffey .................. G06F 3/0481
                                                    715/808

(Continued)

FOREIGN PATENT DOCUMENTS

CN    104023271 A    9/2014
CN    106998486 A    8/2017

(Continued)

OTHER PUBLICATIONS

China National Intellectual Property Administration, Notice of Rejection issued in Chinese Application No. 202010546666.2, Mar. 3, 2022, 5 pages.

(Continued)

Primary Examiner — Tuyetlien T Tran
(74) Attorney, Agent, or Firm — Alleman Hall & Tuttle LLP (57) ABSTRACT

Embodiments of the present disclosure provide a method and apparatus for displaying an activity entrance, an electronic device and a storage medium, where the method is applied in a client, including: receiving an activity promotion video, playing the activity promotion video, and pausing the activity promotion video when the playing reaches a preset image frame; switching from a current playing interface to a mask interface, and displaying the activity entrance in the mask interface.

15 Claims, 4 Drawing Sheets

(56) References Cited

U.S. PATENT DOCUMENTS

| | | | |
|---|---|---|---|
| 2006/0172275 A1* | 8/2006 | Cohen | G09B 7/00 |
| | | | 434/350 |
| 2008/0218632 A1* | 9/2008 | Jung | G11B 27/11 |
| | | | 348/E7.001 |
| 2008/0262912 A1* | 10/2008 | Gargi | G06Q 30/02 |
| | | | 705/14.4 |
| 2008/0276272 A1* | 11/2008 | Rajaraman | G06Q 30/02 |
| | | | 725/37 |
| 2009/0076843 A1* | 3/2009 | Graff | G16H 80/00 |
| | | | 434/350 |
| 2014/0255003 A1* | 9/2014 | Abramson | G06F 16/7834 |
| | | | 386/240 |
| 2014/0282725 A1* | 9/2014 | Brandstetter | H04N 21/4316 |
| | | | 725/36 |
| 2015/0302889 A1* | 10/2015 | Chung | G06F 3/04886 |
| | | | 715/723 |
| 2017/0195613 A1 | 7/2017 | Yang | |
| 2018/0067641 A1 | 3/2018 | Lerner et al. | |
| 2019/0075340 A1* | 3/2019 | Hochart | H04L 51/02 |
| 2019/0108239 A1* | 4/2019 | Yang | G06F 40/166 |
| 2019/0342620 A1* | 11/2019 | Yan | H04N 21/25841 |
| 2020/0336804 A1* | 10/2020 | Cui | H04N 21/4781 |
| 2022/0057984 A1* | 2/2022 | Yang | H04N 21/4782 |

FOREIGN PATENT DOCUMENTS

| | | | | |
|---|---|---|---|---|
| CN | 107995516 A | | 5/2018 | |
| CN | 108650555 A | | 10/2018 | |
| CN | 108769814 A | * | 11/2018 | ......... H04N 21/4312 |
| CN | 109754277 A | | 5/2019 | |
| CN | 109754298 A | | 5/2019 | |
| CN | 110062270 A | | 7/2019 | |
| CN | 110134479 A | | 8/2019 | |
| CN | 110225388 A | | 9/2019 | |
| CN | 110413114 A | | 11/2019 | |
| CN | 305836581 S | | 6/2020 | |
| CN | 111669639 A | | 9/2020 | |
| IN | 109547835 A | | 3/2019 | |
| WO | 2015066919 A1 | | 5/2015 | |

OTHER PUBLICATIONS

China National Intellectual Property Administration, Office action issued in Chinese Application No. 202010546666.2, Sep. 28, 2021, 12 pages. (Submitted with English Summary of Office action).

China National Intellectual Property Administration, Office action issued in Chinese Application No. 202010546666.2, Dec. 21, 2021, 9 pages. (Submitted with English Summary of Office action).

ISA China Patent Office, International Search Report and Written Opinion issued in Application No. PCT/CN2021/098532, Aug. 18, 2021, WIPO, 16 pages.

European Patent Office, Extended European Search Report Issued in Application No. 21826195.6, Sep. 12, 2023, Germany, 8 pages.

* cited by examiner

METHOD AND APPARATUS FOR DISPLAYING ACTIVITY ENTRANCE, ELECTRONIC DEVICE AND STORAGE MEDIUM

CROSS-REFERENCE TO RELATED APPLICATIONS

The present application is a continuation of International Application No. PCT/CN2021/098532, filed on Jun. 7, 2021, which claims priority to Chinese patent application No. 202010546666.2, filed on Jun. 15, 2020. The disclosures of the aforementioned applications are hereby incorporated by reference in their entities.

TECHNICAL FIELD

Embodiments of the present disclosure relate to the technical field of computer, and in particular, to a method and apparatus for displaying an activity entrance, an electronic device and a storage medium.

BACKGROUND

At present, a way to promote activities by software applications is usually to display an activity entrance (such as an activity pendant) at a fixed position in an interface window, and users can enter an activity interface by clicking on the activity entrance. Deficiencies of the prior art at least include: the activity entrance is fixed in the interface window, which causes that every page browsed by the user is blocked, and influences normal browsing of the page by the user; the activity entrance is rather stiff, and there is no good audio-visual interaction with the user; a display area of the activity entrance is small, which can carry relatively less information (for example, only an activity name can be reflected), and the user experience is poor.

SUMMARY

Embodiments of the present disclosure provide a method and apparatus for displaying an activity entrance, an electronic device and a storage medium, which are able to optimize display effects of the activity entrance, and improve user interaction experience.

In a first aspect, an embodiment of the present disclosure provides a method for displaying an activity entrance, applied to a client, including:
receiving an activity promotion video, playing the activity promotion video, and pausing the activity promotion video when the playing reaches a preset image frame;
switching from a current playing interface to a mask interface, and displaying the activity entrance in the mask interface.

In a second aspect, an embodiment of the present disclosure provides an apparatus for displaying an activity entrance, the apparatus is integrated in a client and includes:
a video playing module, configured to receive an activity promotion video, play the activity promotion video, and pause the activity promotion video when the playing reaches a preset image frame;
an interface switching module, configured to switch from a current playing interface to a mask interface, and display the activity entrance in the mask interface.

In a third aspect, an embodiment of the present disclosure provides an electronic device, where the electronic device includes:
one or more processors,
a storage apparatus, configured to store one or more programs,
when the one or more programs are executed by the one or more processors, the one or more processors are caused to implement the method for displaying an activity entrance according to any one of embodiments of the present disclosure.

In a fourth aspect, an embodiment of the present disclosure provides a storage medium including computer-executable instructions, where when the computer-executable instructions are executed by a computer processor, the method for displaying an activity entrance according to any one of embodiments of the present disclosure is performed.

In a fifth aspect, an embodiment of the present disclosure provides a computer program product, where the computer program product includes: a computer program stored in a readable storage medium, where at least one processor of an electronic device can read the computer program from the readable storage medium, and the at least one processor executes the computer program, to cause the electronic device to perform the method according to any one of the above first aspect.

In a sixth aspect, an embodiment of the present disclosure provides a computer program, where the computer program is stored in a readable storage medium, at least one processor of an electronic device can read the computer program from the readable storage medium, and the at least one processor executes the computer program, to cause the electronic device to perform the method according to any one of the above first aspect.

According to the technical solution of the embodiments of the present disclosure, a client receives an activity promotion video sent by a server, plays the activity promotion video, and pauses the activity promotion video when the playing reaches a preset image frame; switches from a current playing interface to a mask interface, and displays an activity entrance in the mask interface. According to the technical solution of the embodiments of the present disclosure, by carrying more activity information in the activity promotion video, for example, exposing activity play rules or prize content, etc., users are enabled to learn more activity information, circumstances can be avoided to happen to some extent that users interested in the activity miss the activity, or users not interested in the activity accidentally enter the activity interface, thus improving user experience; by switching to a mask that displays the activity entrance when the playing of the activity promotion video reaches a preset image frame, not only a display manner and a display area and position of the activity entrance are optimized, good audio-visual interaction with users are conducted, but also the users will not be disturbed by the activity entrance when playing other videos or browsing other pages, thereby improving user experience.

BRIEF DESCRIPTION OF DRAWINGS

The above and other features, advantages and aspects of various embodiments of the present disclosure will become clearer when referring to the accompanying drawings and following specific embodiments. Throughout the drawings, same or similar reference numerals represent same or similar elements. It shall be understood that the drawings are illustrative, and the components and elements are not necessarily drawn to scale.

DESCRIPTION OF EMBODIMENTS

Embodiments of the present disclosure will be described in more detail in the following with reference to the accompanying drawings. Although some embodiments of the present disclosure are shown in the drawings, it should be understood that the present disclosure can be implemented in various forms and should not be construed as limited to the embodiments set forth here. On the contrary, these embodiments are provided for a more thorough and complete understanding of the present disclosure. It should be understood that the drawings and embodiments of the present disclosure are only for illustrative purposes, and are not intended to limit the scope of protection of the present disclosure.

It should be understood that steps described in the method embodiments of the present disclosure can be performed in different order and/or in parallel. In addition, the method embodiments may include additional steps and/or omit the steps shown. The scope of the present disclosure is not limited in this respect.

As used herein, the term "including" and its variations are open including, that is, "including but not limited to". The term "based on" means "based at least in part on". The term "one embodiment" means "at least one embodiment"; the term "another embodiment" means "at least one other embodiment"; the term "some embodiments" means "at least some embodiments". Relevant definitions of other terms will be given in the following description.

It should be noted that the concepts such as "first" and "second" mentioned in the present disclosure are only used to distinguish different apparatuses, modules or units, and are not used to limit the order or interdependence of the functions performed by these apparatuses, modules or units.

It should be noted that the modifiers of "one" and "multiple" mentioned in the present disclosure are illustrative rather than restrictive, and those skilled in the art should understand that unless the context clearly indicates otherwise, they should be understood as "one or more".

Embodiment 1

Figure 1:
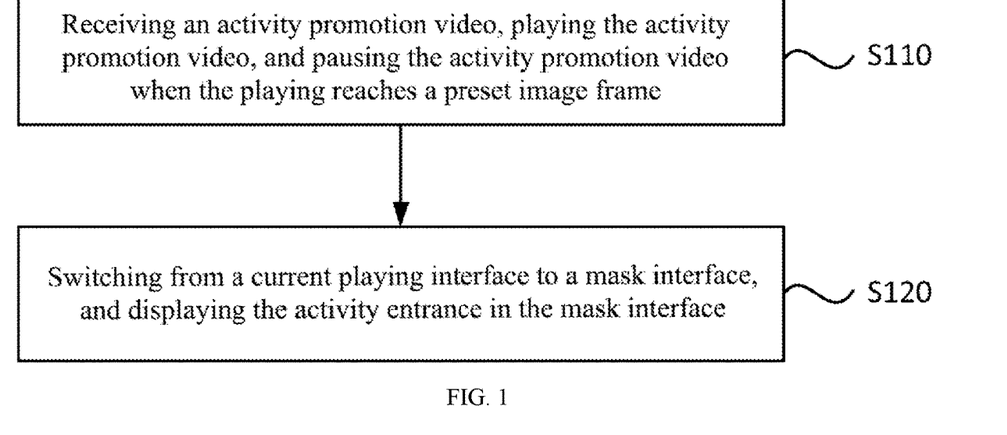
FIG. 1 is a schematic flowchart of a method for displaying an activity entrance provided by Embodiment 1 of the present disclosure.

FIG. 1 is a schematic flowchart of a method for displaying an activity entrance provided by Embodiment 1 of the present disclosure. The embodiment of the present disclosure is particularly adaptive to a circumstance that a client displays an activity entrance, and the method can be performed by an apparatus for displaying an activity entrance, where the apparatus can be implemented in forms of software and/or hardware, the apparatus can be integrated in the client, can be installed in an electronic device along with the client, for example, installed in electronic devices such as cell phones, tablet computers, laptop computers, or desktop computers.

As shown in FIG. 1, a method for displaying an activity entrance provided by the embodiment of the present disclosure, the method is applied in a client and includes:

S110, receiving an activity promotion video, playing the activity promotion video, and pausing the activity promotion video when the playing reaches a preset image frame.

An applicant platform often launches some activities according to business needs, and the activities can be promoted through the client, where the activities include at least one of the following: getting red envelopes, getting virtual prizes, getting physical prizes, product promotion and so on. In addition, the method for displaying an activity entrance provided in the present embodiment can also be applied to other activities, which will not be listed one by one here.

In the embodiment of the present disclosure, a designer can make corresponding activity promotion videos for different activities in advance, and video content of the activity promotion video can carry information such as an activity title, activity award content and manners to obtain the awards, which can carry more abundant activity information compared to a traditional activity pendant.

In a process of making the activity promotion video, the designer can consider in respect of promotion effects, to select a preset image frame from respective image frames of the activity promotion video. Illustratively, when the activity is getting red envelopes, a corresponding image frame when a figure in the video says "Give you a red envelope!" is selected as the preset image frame; and when the activity is product promotion, a corresponding image frame when a figure in the video says "Buy it!" is selected as the preset image frame. Users are guided to participate in the activity according to pictures and voices of the activity promotion video, which more conforms to the intrinsic form of activity guiding, and improves user audio-visual interaction experience.

In addition, multiple versions of the same activity promotion video can be designed according to hardware parameters of different electronic devices, for example, multiple versions with different resolutions of the same activity promotion video can be designed, or multiple versions adaptive to different screen sizes of the same activity promotion video can be designed, so as to satisfy needs of different electronic devices to play the activity promotion video.

After the finished activity promotion video is uploaded onto a server, the server can send an activity promotion video matching hardware parameters of a device running the client to the client, so as to enable the client to normally play the received activity promotion video. The client can immediately play the activity promotion video when finishing loading the activity promotion video; or can play the activity promotion video when a current condition satisfies a preset condition, for example, when the client logs in again, the activity promotion video is played, for another example, when the client receives a play instruction of the activity promotion video, the activity promotion video is played.

By playing the activity promotion video, the client enables users to learn activity rules and prize content of the activities by way of viewing, provides users with good audio-visual interactions, so as to enable users to learn more about the activity information, by which circumstances can be avoided to happen to some extent that users interested in the activity miss the activity, or users not interested in the activity accidentally enter the activity interface, thus improving user experience. In addition, when the client plays the activity promotion video when the playing reaches a preset image frame, pausing of the activity promotion video being played can be triggered, so as to avoid interference to the displaying of the activity entrance.

S120, switching from a current playing interface to a mask interface, and displaying the activity entrance in the mask interface.

In the embodiment of the present disclosure, when pausing the playing of the activity promotion video, the client can superpose the mask interface on the current playing interface, in this way, the image frame covered by the mask interface and information such as description text of the activity promotion video are fuzzified, thus avoiding interference on the displaying of the activity entrance from the information of the playing interface.

In a specific embodiment, the mask interface can be a full-screen interface, and the displaying the activity entrance in the mask interface may be: displaying an entrance prop, a guiding text, etc., of the activity entrance on the mask interface, and the mask interface may be a full-screen interface. The entrance prop of the activity entrance may be an element model diagram relating to the activity, for example, when the activity is getting red envelopes, the entrance prop may be a red envelope model diagram.

Compared with traditional activity pendants displayed at the side and corner positions of the interface window, by displaying the activity entrance in the mask interface, the display effect and position of the activity entrance can be optimized, and by setting the entrance prop of the activity entrance relating to the activity, the visual interaction experience of users can be improved.

In an embodiment, the displaying the activity entrance in the mask interface includes: letting a pop-up window interface containing an entrance prop entering the mask interface with a preset animation effect, and making the pop-up window interface stay in a center position of the mask interface.

The activity entrance may be a pop-up window interface displaying the entrance prop. The displaying the activity entrance in the mask interface may be: superposing the pop-up window interface containing the entrance prop on the mask interface. Parameters such as transparency and scale of the pop-up window interface can be configured, to improve display effect of the entrance prop. The preset animation effect can be performed once or be repeatedly performed for several times, and the preset animation effect can be, for example, flying in from the side, appearing from small to large, appearing from fuzzy to clear, etc., which is not specifically limited here. By displaying the pop-up window interface containing the entrance prop in the form of animation, the display effect of the activity entrance can be further optimized, and by making the pop-up window interface finally stay at the center of the mask interface, the display position of the activity entrance can be further optimized.

In an embodiment, the client is applied to a scenario of pushing video-type feed streams; correspondingly, the activity promotion video is pushed by the server according to activity preference characteristics of the client.

In the present embodiment, the feed stream can be understood as an information stream that is continuously updated and presented to users, such as pictures, texts, short videos or long videos, and both short videos and long videos belong to video-type feed streams. When receiving a refresh instruction (such as sliding down or sliding up the playing interface), the client can send a refresh request to the server; the server can generate a video-type feed stream and push it to the client according to the received refresh request. In the process of watching the video-type feed stream by the users, the client can receive the activity promotion video pushed by the server and play the same, which is an activity promotion mode more natural than a traditional display mode of displaying the activity pendant stiffly in the interface window.

In the present embodiment, the server can push the activity promotion video according to the activity preference characteristics of the client. A way for the server to determine the activity preference characteristics of the client can be to set user portrait labels for the client by counting the user operations of the client such as watching, collecting, liking, forwarding or commenting on videos, and these labels can be used as the activity preference characteristics of the client. For example, if the video type that is mostly watched by the client is a game-type, the activity preference characteristics of the client is determined as game, and further game-type activity promotion videos (such as activity promotion videos of getting game props) are pushed to the client.

By pushing the activity promotion video according to the activity preference characteristics of the client, the pushing can be performed more flexibly for activity preference type users, a conversion rate from watching the activity promotion video to participating in the activity is increased, and interference to users not sensitive to the activity is avoided.

Figure 2:
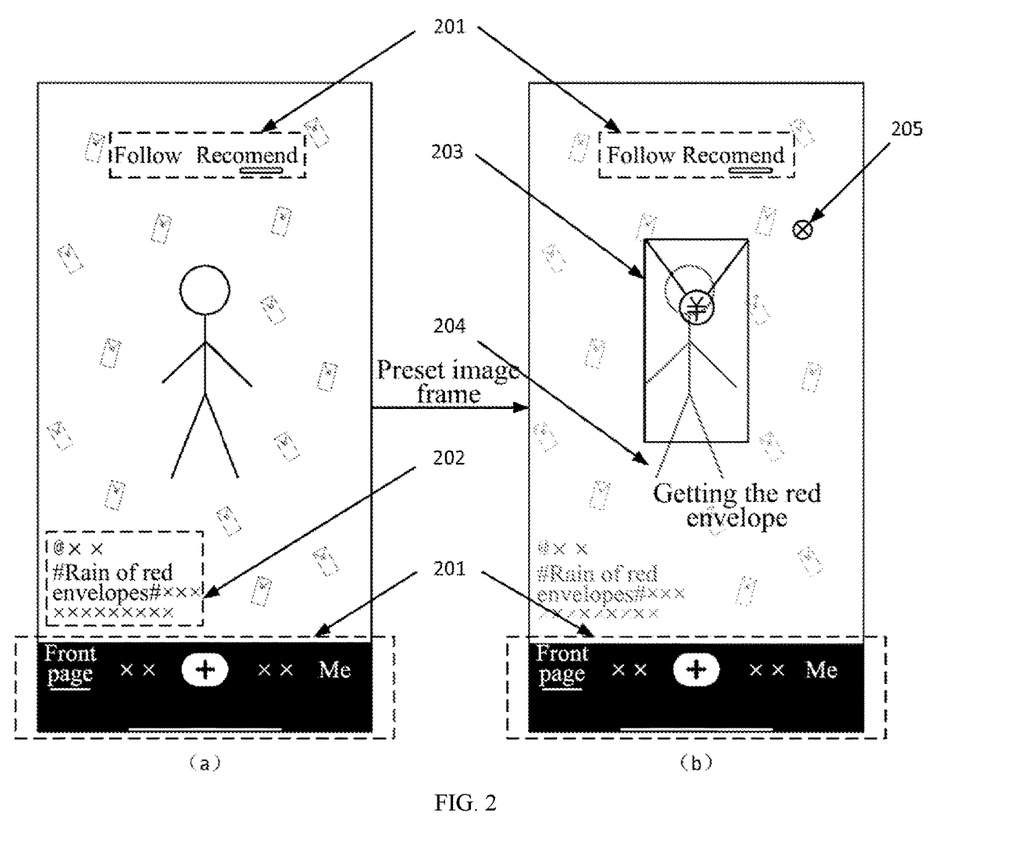
FIG. 2 is a schematic diagram of interface switching in the method for displaying an activity entrance provided by Embodiment 1 of the present disclosure.

FIG. 2 is a schematic diagram of interface switching in a method for displaying an activity entrance provided by Embodiment 1 of the present disclosure. Specifically, a schematic diagram of interface switching in a method for displaying an activity entrance of the activity of getting red envelopes is provided.

As shown in FIG. 2, figure (a) is a playing interface of the client, and figure (b) is a mask interface of the client. The interface shown in figure (a) and figure (b) includes navigation bar areas 201 (for example, tab navigation bars), and these navigation bar areas 201 may locate at the top layer of the interface so as not to be blocked by the activity promotion video and the mask layer, and may be areas with certain transparency or being not transparent. In the playing interface of figure (a), the activity promotion video of the activity of getting red envelopes can be played in full screen, and a description text 202 of the activity promotion video can be displayed at the lower left of the video being played. When the playing of the activity promotion video reaches a preset image frame, the playing of the activity promotion video can be paused, and the mask interface can be covered on the playing interface, to realize switching from the playing interface shown in figure (a) to the mask interface shown in figure (b). In the mask interface shown in figure (b), a pop-up window interface 203 displaying a red envelope prop, a text control 204 displaying a text of "Getting the red envelope", and an exit control 205, etc., can be set therein.

According to the technical solution of the embodiments of the present disclosure, a client receives an activity promotion video sent by a server, plays the activity promotion video, and pauses the activity promotion video when the playing reaches a preset image frame; switches from a current playing interface to a mask interface, and displays an activity entrance in the mask interface. According to the technical solution of the embodiments of the present disclosure, by carrying more activity information in the activity promotion video, for example, exposing activity play rules or prize content, etc., users are enabled to learn more activity information, circumstances can be avoided to happen to some extent that users interested in the activity miss the activity, or users not interested in the activity accidentally enter the activity interface, thus improving user experience; by switching to a mask that displays the activity entrance when the playing of the activity promotion video reaches a preset image frame, not only a display manner and a display area and position of the activity entrance are optimized, good audio-visual interaction with users are conducted, but also the users will not be disturbed by the activity entrance when playing other videos or browsing other pages, thereby improving user experience.

Embodiment 2

Figure 3:
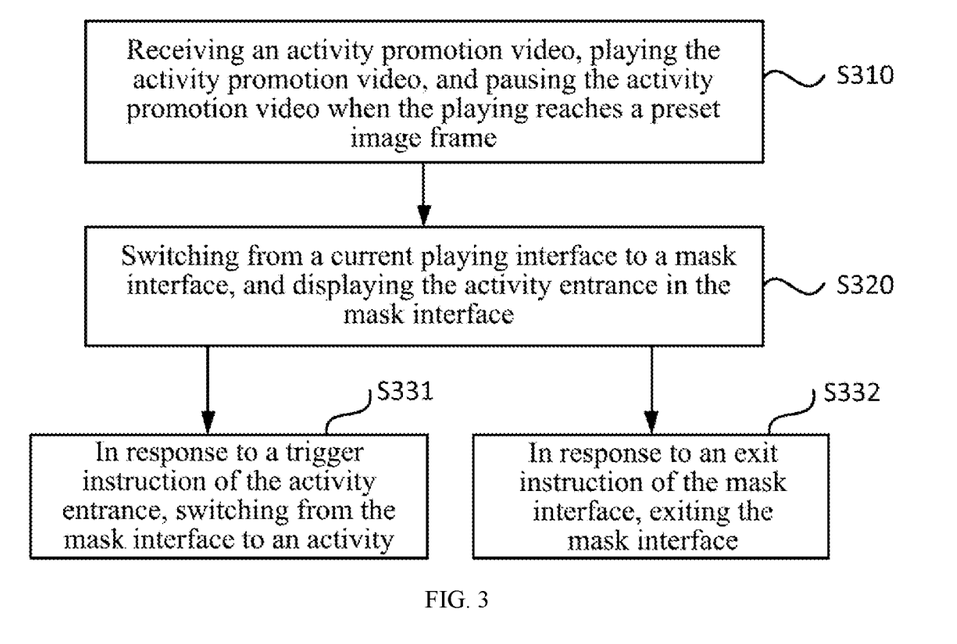
FIG. 3 is a schematic flowchart of a method for displaying an activity entrance provided by Embodiment 2 of the present disclosure.

FIG. 3 is a schematic flowchart of a method for displaying an activity entrance provided by Embodiment 2 of the present disclosure. The present embodiment can be combined with various optional solutions in the method for displaying an activity entrance provided in the above embodiment. The method for displaying an activity entrance provided by the present embodiment optimizes interface interactions after the activity entrance is displayed, which further improves user interaction experience.

As shown in FIG. 3, a method for displaying an activity entrance provided by the embodiment of the present disclosure includes:

S310, receiving an activity promotion video, playing the activity promotion video, and pausing the activity promotion video when the playing reaches a preset image frame;

S320, switching from a current playing interface to a mask interface, and displaying the activity entrance in the mask interface;

S331, in response to a trigger instruction of the activity entrance, switching from the mask interface to an activity interface.

In the embodiment of the present disclosure, a user can input a trigger instruction of the activity entrance in the mask interface, and since the mask interface exists, a problem of conflict with an instruction input in the playing interface can be avoided. For example, here the user performs a click operation in the playing interface is to input a pause instruction, the user performs the click operation in the mask interface is to input the trigger instruction of the activity entrance.

In response to the trigger operation of the activity entrance, the client can request, from the server, to access the activity interface, to cause the server to send data of the activity interface to the client; when receiving the data of the activity interface sent by the server, the client can perform rendering on the activity interface according to the received data, to realize switching from the mask interface to the activity interface. By receiving the trigger instruction acted on the activity entrance of the mask interface, the client can realize direct switching from the mask interface to the activity interface, thus providing good interface interaction to users.

In an embodiment, a generation manner of the trigger instruction of the activity entrance includes: generating the trigger instruction of the activity entrance according to a user operation acted on an entrance prop or a guiding text of the activity entrance; or, generating the trigger instruction of the activity entrance according to a user operation acted on a random area other than a navigation bar area and an exit control area in the mask interface.

The user operation may be operations such as clicking, double-clicking or long pressing. The client can generate the trigger instruction of the activity entrance according to the user operation acted on certain areas in the mask interface, and these areas are, for example, areas where the entrance prop or the guiding text is located, or random areas other than the navigation bar area and the exit control area, and specific generating manner can be set according to actual needs, which will not be listed one by one here.

In an embodiment, after switching from the mask interface to the activity interface, the method further includes: in response to an exit instruction of the activity interface, exiting the activity interface; or, in response to an exit instruction of the activity interface, displaying a pop-up window interface displaying an activity interface route; in response to a confirm instruction of the activity interface route, closing the pop-up window interface and exiting the activity interface.

The client can generate the exit instruction of the activity interface according to the user operation acted on the exit control in the activity interface. In addition, in response to the exit instruction of the activity interface, the client can directly exit the activity interface, or display the pop-up window interface displaying the activity interface route, so as to prompt the user the route to re-enter the activity interface, which is convenient for the user to re-enter the activity interface. The client can also generate the confirm instruction of the activity interface route according to the user operation acted on a confirm control of the activity route in the pop-up window interface, and can close the pop-up window and exit the activity interface in response to the confirm instruction.

In an embodiment, after switching from the mask interface to the activity interface, the method further includes: in response to an edit instruction of a comment area in the activity interface, generating comment content in the comment area, or generating interaction content for existing comment content in the comment area; or, in response to a trigger instruction of a sub-activity interface link in the activity interface, switching from the activity interface to a sub-activity interface.

The edit instruction of the comment area includes, but is not limited to, instructions such as an instruction to post comments, an instruction to browse, like, reply or forward posted comments, etc.; correspondingly, in response to the edit instruction of the comment area, the client can generate new comment content, or generate interaction content such as likes or replies to existing comment content, or interaction operations such as browsing or forwarding. By setting the comment area in the activity interface, the users can communicate and exchange information such as activity strategy in the comment area, which not only improves user experience in participating the activity, but is also beneficial to secondary fermentation of the activity and improves promotion effect of the activity.

In addition, links of the sub-activity interfaces can also be set in the activity interface, and after the user triggers the links of these sub-activity interfaces, and the current activity interface can be skipped to the sub-activity interface, so as to guide the user to deeply participate in the activity. For example, the activity interface can be an activity interface of getting red envelopes, and the sub-activity interface can be an interface to invite friends to participate in the activity, and a reward mechanism, such as increasing the chance of getting red envelopes by successfully inviting friends to participate in, can be set, to further attract users to participate.

S332, in response to an exit instruction of the mask interface, exiting the mask interface.

In the present embodiment, the client can also generate the exit instruction of the mask interface according to the user operation acted on certain areas of the mask interface, and these areas are different from areas corresponding to generation of the trigger instruction of the activity entrance. For example, when the area corresponding to generation of the trigger instruction of the activity entrance is the area where the entrance prop or the guiding text is located, any random areas other than the entrance prop or the guiding text can be taken as the area corresponding to generation of the exit instruction of the mask interface; for another example, when the area corresponding to generation of the trigger instruction of the activity entrance is a random area other than the navigation bar area and the exit control area, the exit control area can be taken as the area corresponding to generation of the exit instruction of the mask interface. In response to the exit instruction of the mask interface, the client exits the mask interface.

In an embodiment, when exiting the mask interface, or after exiting the mask interface, the method further includes: playing another received video other than the activity promotion video; or, continuing playing the activity promotion video, until the activity promotion video ends.

When exiting the mask interface or exiting the activity interface, the client can return to the playing interface, and can further use the playing interface to continue playing the activity promotion video, or to play other videos. In addition, when the client plays the activity promotion video to the end, the client can automatically switch to the playing of other videos; or can also switch to an end playing interface. The client can switch to other videos for playing in response to a switch instruction acted on the end playing interface, or replay/collect/forward the activity promotion video in response to a replay/collect/forward instruction acted on the end playing interface.

Further, in the process of continuing playing the activity promotion video, the method further includes: in response to a video switch instruction, switching from the activity promotion video to another video other than the activity promotion video, and playing the another video.

If the client continues playing the activity promotion video after returning to the playing interface, the client can also switch from the activity promotion video to other videos for playing according to the video switch instruction input by the user in the process of playing the activity promotion video.

Further, in the process of continuing playing the activity promotion video, the method further includes: keeping displaying an activity pendant in a preset area of the activity promotion video.

A shape of the activity pendant can be designed as same or similar as the entrance prop of the activity entrance. When the client exits the mask interface and/or the activity interface, the activity pendant can be set in the preset area of the activity promotion video, for example, such as above video description information of the activity promotion video, and when the client plays the activity promotion video again, the activity pendant is still set in the preset area of the activity promotion video. By keeping displaying the activity pendant in the preset area of the activity promotion video, not only the activity entrance is provided to the user, but also no interference is caused to the user from watching other videos.

In an embodiment, in a process of playing the activity promotion video again, determining whether a trigger instruction of the activity pendant is received; if yes, switching from the current playing interface to the activity interface; if no, playing the activity promotion video until the activity promotion video ends.

Under a circumstance that there already exists an activity pendant in the preset area of the activity promotion video, if the client plays the activity promotion video again, it is considered that the client has already displayed the mask interface containing the activity entrance, and the activity promotion video does not need to be paused when its playing reaches preset image frame, and the playing of the mask interface does not need to be performed, so as to avoid influence on watching experience of the user under the circumstance that the user wants to watch the entire activity promotion video again. In addition, when the user watches again, if the client receives a trigger instruction of the activity pendant input by the user, the current playing interface can be directly switched to the activity interface, which enriches manners to enter the activity interface, and generates good interaction with the user.

In addition, if no activity pendant is set in the preset area of the activity promotion video, it can be considered that the client has not displayed the mask interface containing the activity entrance. At this time, even if the activity promotion video is not played by the client for the first time, the activity promotion video can still be paused when the playing reaches the preset image frame, and the switching to the mask interface displaying the activity entrance is performed.

Figure 4:
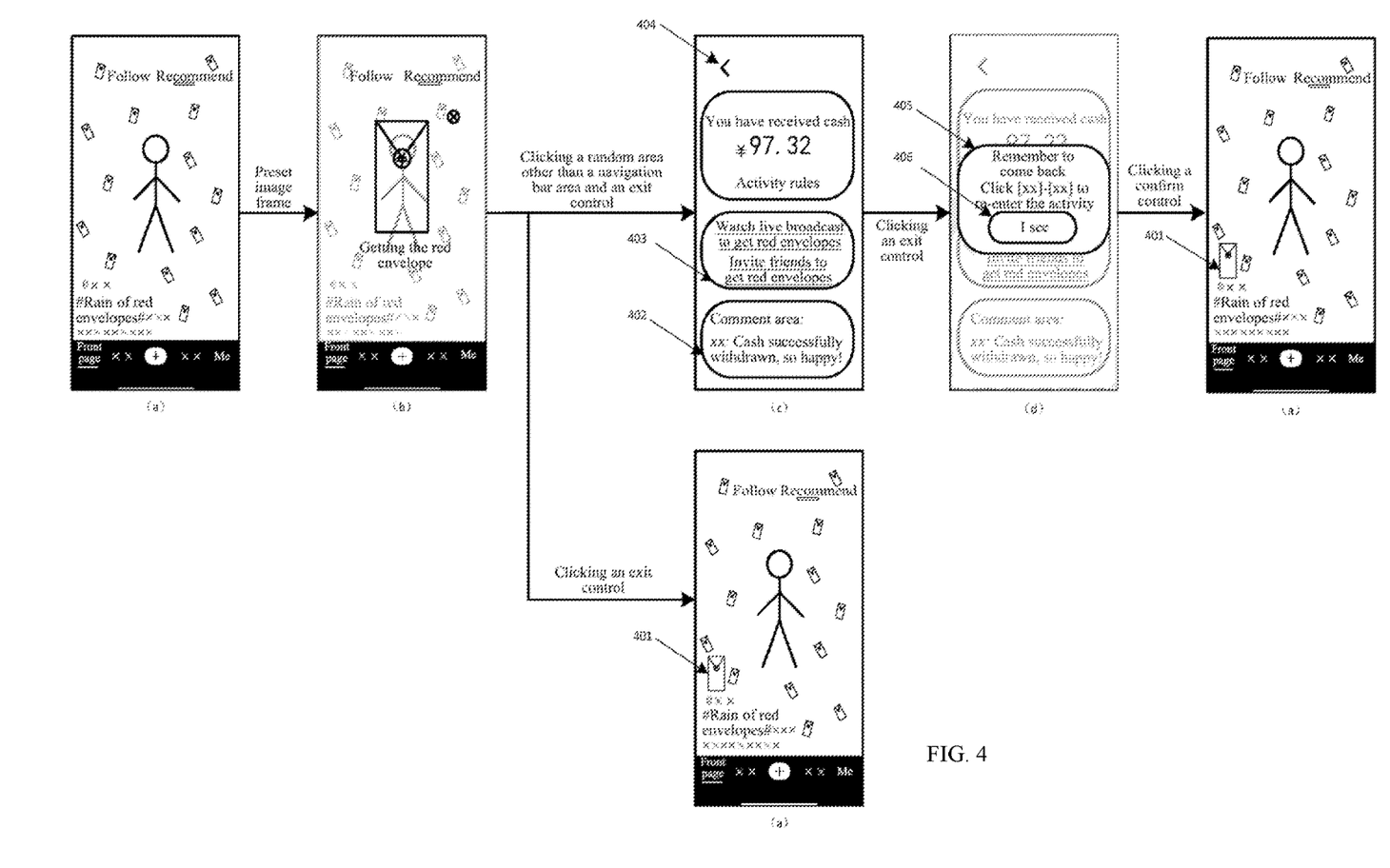
FIG. 4 is a schematic diagram of interface switching in the method for displaying an activity entrance provided by Embodiment 2 of the present disclosure.

FIG. 4 is a schematic diagram of interface switching in a method for displaying an activity entrance provided by Embodiment 2 of the present disclosure. Specifically, a schematic diagram of interface switching in a method for displaying an activity entrance of the activity of getting red envelopes is provided.

As shown in FIG. 4, figure (a) is a playing interface of the client, figure (b) is a mask interface of the client, figure (c) is an activity interface of the client, and figure (d) is a pop-up window interface displaying an activity interface route of the client. It can be considered that figure (a) and figure (b) in FIG. 4 is the same as figure (a) and figure (b) in FIG. 2.

When the client switches a playing interface shown in figure (a) to a mask interface shown in figure (b), the client can return to the playing interface shown in figure (a) in response to an exit instruction of the mask interface generated by clicking on an exit control by a user, and can continue playing the activity promotion video, and set an activity pendant 401 in an area above video description information of the activity promotion video.

When the client switches from the playing interface shown in figure (a) to the mask interface shown in figure (b), the client can also respond to a trigger instruction of the activity entrance generated by clicking a random area other than a navigation bar area and an exit control area by the user, and can switch from the mask interface shown in figure (b) to the activity interface shown in figure (c). In the activity interface shown in figure (c), a comment area 402, a link 403 of a sub-activity interface and an exit control 404, etc., can be set.

Further, the client can, in response to an edit instruction of a comment area in the activity interface, generate comment content in the comment area, or generate interaction content for existing comment content in the comment area; or, in response to a trigger instruction of a sub-activity interface link in the activity interface, switch from the activity interface to a sub-activity interface. In addition, the client can switch from the activity interface shown in figure (c) to a pop-up window interface 405 displaying an activity interface route shown in figure (d) in response to an exit instruction of the activity interface generated by clicking an exit control by the user, and the client can close the pop-up window interface and exit the activity interface, and return to the playing interface shown in figure (a) in response to a confirm instruction of the activity interface route generated by clicking a confirm control 406 by the user, and the client can also continue playing the activity promotion video, and set the activity pendant 401 in the area above the video description information of the activity promotion video.

According to the technical solution of the embodiment of the present disclosure, the client can realize switching from the mask interface to the activity interface, or exiting the mask interface; after switching to the activity interface, the client can realize using the comment area as activity ferment, guiding the user to enter the sub-activity interface, exiting the activity interface, or exiting the activity interface after displaying the pop-up window interface displaying the activity interface route; after exiting the activity interface, the client can continue playing the activity promotion video, or directly play other videos; after exiting the activity interface or the mask interface, the client can keep displaying the activity pendant in the preset area of the activity promotion video, and can take the activity pendant as the activity entrance when playing again, to re-enter the activity interface; after setting the activity pendant and playing the activity promotion video again, the client can avoid displaying the mask interface repeatedly, and can avoid interfering the users in watching the activity promotion video. By adding the above interface interaction, user interaction experience is further improved.

Embodiment 3

Figure 5:
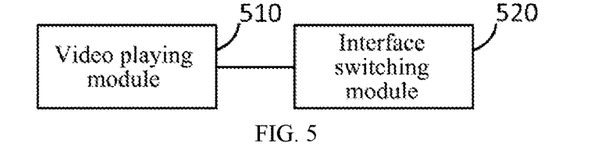
FIG. 5 is a schematic structural diagram of an apparatus for displaying an activity entrance provided by Embodiment 3 of the present disclosure.

FIG. 5 is a schematic structural diagram of an apparatus for displaying an activity entrance provided by Embodiment 3 of the present disclosure. The apparatus for displaying an activity entrance provided by the present embodiment is adapted to a scenario that a client displays an activity entrance.

As shown in FIG. 5, the apparatus for displaying an activity entrance is integrated in a client and includes:
  a video playing module 510, configured to receive an activity promotion video, play the activity promotion video, and pause the activity promotion video when the playing reaches a preset image frame;
  an interface switching module 520, configured to switch from a current playing interface to a mask interface, and display the activity entrance in the mask interface.

In an embodiment, the interface switching module 520 is further configured to:
  after displaying the activity entrance in the mask interface, in response to a trigger instruction of the activity entrance, switch from the mask interface to an activity interface; or, in response to an exit instruction of the mask interface, exit the mask interface.

In an embodiment, the interface switching module 520 is further configured to:
  after switching from the mask interface to the activity interface, in response to an exit instruction of the activity interface, exit the activity interface; or, in response to an exit instruction of the activity interface, display a pop-up window interface displaying an activity interface route; in response to a confirm instruction of the activity interface route, close the pop-up window interface and exit the activity interface.

In an embodiment, the apparatus for displaying an activity entrance further includes:
  an activity interface responding module, configured to, after switching from the mask interface to the activity interface, in response to an edit instruction of a comment area in the activity interface, generate comment content in the comment area, or generate interaction content for existing comment content in the comment area; or, in response to a trigger instruction of a sub-activity interface link in the activity interface, switch from the activity interface to a sub-activity interface.

In an embodiment, the video playing module 510 is further configured to, when exiting the mask interface, or after exiting the mask interface, play another received video other than the activity promotion video; or, continue playing the activity promotion video, until the activity promotion video ends.

In an embodiment, the video playing module 510 is further configured to, in a process of continuing playing the activity promotion video, in response to a video switch instruction, switch from the activity promotion video to another video other than the activity promotion video, and play the another video.

In an embodiment, the apparatus for displaying an activity entrance further includes:
  a pendant keeping displaying module, configured to, in a process of continuing playing the activity promotion video, keep displaying an activity pendant in a preset area of the activity promotion video.

In an embodiment, in a process that the video playing module 510 plays the activity promotion video again, the interface switching module 520 is further configured to determine whether a trigger instruction of the activity pendant is received; if yes, switch from the current playing interface to the activity interface; if no, the video playing module 510 plays the activity promotion video until the activity promotion video ends.

In an embodiment, the client is applied to a scenario of pushing video-type feed streams; correspondingly, the activity promotion video is pushed by a server according to activity preference characteristics of the client.

In an embodiment, the interface switching module 520 includes:
  an activity entrance displaying sub-module, configured to let a pop-up window interface containing an entrance prop enter the mask interface with a preset animation effect, and make the pop-up window interface stay in a center position of the mask interface.

In an embodiment, the activities include at least one of the following: getting red envelopes, getting virtual prizes, getting physical prizes, product promotion and so on.

In an embodiment, the interface switching module 520 further includes:
  a trigger instruction generating sub-module, configured to: generate the trigger instruction of the activity entrance according to a user operation acted on an entrance prop or a guiding text of the activity entrance; or, generate the trigger instruction of the activity entrance according to a user operation acted on a random area other than a navigation bar area and an exit control area in the mask interface.

The apparatus for displaying an activity entrance provided by the embodiments of the present disclosure can perform the method for displaying an activity entrance provided by any embodiment of the present disclosure, which has corresponding functional modules for performing the method and beneficial effects.

It shall be noted that, respective units and modules included in the above apparatus are divided only according to functional logics, but are not limited to the above division, as long as corresponding functions can be implemented; in addition, specific names of the respective functional units are just for distinguishing from each other, and are not used to limit the protection scope of the embodiments of the present disclosure.

Embodiment 4

Figure 6:
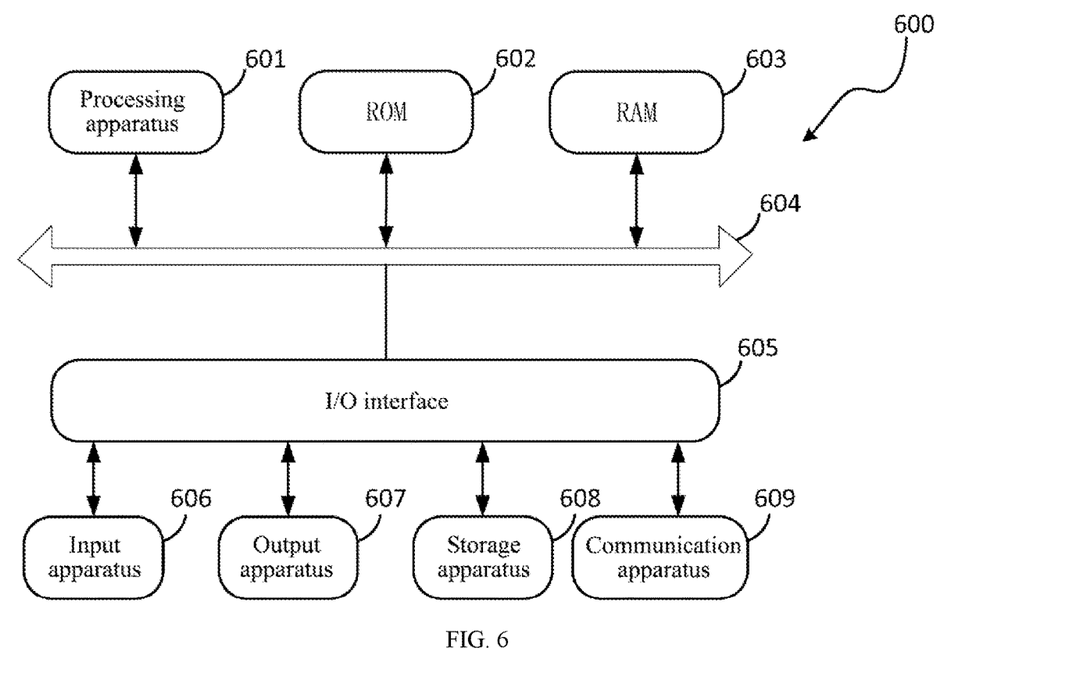
FIG. 6 is a schematic structural diagram of an electronic device provided by Embodiment 4 of the present disclosure.

Referring to FIG. 6, it shows a schematic structural diagram of an electronic device 600 (e.g., a terminal device or a server in FIG. 6) suitable for implementing the embodiments of the present disclosure. The terminal device in the embodiment of the present disclosure may include, but is not limited to, mobile terminals such as a mobile phone, a notebook computer, a digital broadcast receiver, a personal digital assistant (PDA), a portable android device (PAD), a portable media player (PMP), a vehicle-mounted terminal (e.g., vehicle navigation terminals), and fixed terminals such as a digital TV, a desktop computer, and the like. The electronic device shown in FIG. 6 is only an example, and should not bring any limitation to the functions and application scope of the embodiments of the present disclosure.

As shown in FIG. 6, the electronic device 600 may include a processing apparatus 601 (such as a central processing unit, a graphics processing unit, etc.), which may perform various appropriate actions and processes according to a program stored in a read only memory 602 (ROM) or a program loaded into a random access memory 603 (RAM) from a storage apparatus 608. In the RAM 603, various programs and data required for the operation of the electronic device 600 are also stored. The processing apparatus 601, ROM 602, and RAM 603 are connected to each other through a bus 604. An input/output (I/O) interface 605 is also connected to the bus 604.

Generally, the following apparatuses can be connected to the I/O interface 605: an input apparatus 606 including, for example, a touch screen, a touch panel, a keyboard, a mouse, a camera, a microphone, an accelerometer, a gyroscope, etc.; an output apparatus 607 including, for example, a liquid crystal display (LCD), a speaker, a vibrator, etc.; a storage apparatus 608 including a magnetic tape, a hard disk, etc.; and a communication apparatus 609. The communication apparatus 609 may allow the electronic device 600 to perform wireless or wired communication with other devices to exchange data. Although FIG. 6 shows the electronic device 600 with various apparatuses, it should be understood that it is not required to implement or have all the apparatuses shown. More or fewer apparatuses may be implemented or provided instead.

Particularly, according to the embodiments of the present disclosure, the process described above with reference to the flowchart can be implemented as a computer software program. For example, embodiments of the present disclosure include a computer program product, which includes a computer program carried on a non-transitory computer-readable medium, and the computer program containing program codes for performing the method shown in the flowchart. In such embodiment, the computer program can be downloaded and installed from the network through the communication apparatus 609, or installed from the storage apparatus 608 or the ROM 602. When the computer program is executed by the processing apparatus 601, it performs the above functions defined in the method of the embodiment of the present disclosure.

The electronic device provided by the embodiment of the present disclosure belongs to the same disclosed concept as the method for displaying an activity entrance provided by the above embodiments. For technical details not described in detail in the present embodiment, reference can be made to the above-mentioned embodiments, and the present embodiment has the same beneficial effects as the above-mentioned embodiments.

Embodiment 5

The embodiment of the present disclosure provides a computer storage medium storing a computer program thereon, and when the computer program is executed by a processor, the method for displaying an activity entrance provided by the above embodiments is implemented.

It should be noted that the above-mentioned computer-readable medium of the present disclosure can be a computer-readable signal medium or a computer-readable storage medium or any combination of the above two. The computer-readable storage medium can be, for example, but not limited to, an electronic, magnetic, optical, electromagnetic, infrared, or semiconductor system, apparatus or component, or any combination of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM) or a FLASH memory, an optical fiber, a compact disk-read only memory (CD-ROM), an optical storage component, a magnetic storage component, or any suitable combination of the above. In the present disclosure, the computer-readable storage medium can be any tangible medium that contains or stores a program that can be used by or in connection with an instruction execution system, apparatus or device. In the present disclosure, computer-readable signal medium may include data signals propagated in a baseband or as part of a carrier wave, in which computer-readable program codes are carried. This propagated data signal can take various forms, including but not limited to electromagnetic signal, optical signal or any suitable combination of the above. The computer-readable signal medium can also be any computer-readable medium other than the computer-readable storage medium, and the computer-readable signal medium can send, propagate or transmit a program for use by or in connection with the instruction execution system, apparatus or device. The program code contained on the computer-readable medium can be transmitted by any suitable medium, including but not limited to: electric wire, optical cable, radio frequency (RF), etc., or any suitable combination of the above.

In some embodiments, the client and the server can communicate by using any currently known or future developed network protocol such as HTTP (Hyper Text Transfer Protocol), and can be interconnected with any form or medium of digital data communication (e.g., communication network). Examples of the communication network include a local area network (LAN), a wide area network (WAN), an inter-network (e.g., Internet) and an end-to-end network (e.g., ad hoc end-to-end network), and any currently known or future developed network.

The computer-readable medium may be included in the electronic device; or it can exist separately without being assembled into the electronic device.

The computer-readable medium carries one or more programs which, when executed by the electronic device, cause the electronic device to:

receive an activity promotion video sent by a server, play the activity promotion video, and pause the activity promotion video when the playing reaches a preset image frame; switch from a current playing interface to a mask interface, and display the activity entrance in the mask interface.

Computer program codes for performing the operations of the present disclosure can be written in one or more programming languages or their combinations, including but not limited to object-oriented programming languages such as Java, Smalltalk, C++, and conventional procedural programming languages such as "C" language or similar programming languages. The program can be executed completely on the user's computer, partially on the user's computer, as an independent software package, partially on the user's computer, partially on a remote computer, or completely on a remote computer or a server. In the case of a remote computer, the remote computer can be connected to a user computer through any kind of networks, including a local area network (LAN) or a wide area network (WAN), or can be connected to an external computer (for example, using an Internet service provider to connect through the Internet).

The flowchart and block diagrams in the accompanied drawings illustrate the system architecture, functions and operations of possible implementations of systems, methods and computer program products according to various embodiments of the present disclosure. In this regard, each block in the flowchart or block diagram may represent a module, a program segment, or a part of a code, and the module, the program segment, or the part of the code contain one or more executable instructions for implementing the specified logical functions. It should also be noted that in some alternative implementations, the functions marked in the blocks may also occur in a different order than those marked in the drawings. For example, two consecutive blocks can actually be executed basically in parallel, and sometimes they can be executed in reverse order, depending on the functions involved. It should also be noted that each block in the block diagram and/or flowchart, and the combination of blocks in the block diagram and/or flowchart, can be implemented by a dedicated hardware-based system that performs specified functions or operations, or can be implemented by a combination of dedicated hardware and computer instructions.

The units involved in the embodiments described in the present disclosure can be implemented by software or hardware. The name of a unit or a module does not limit the unit or the module itself in some cases. For example, a video playing module can also be described as a "playing module".

The functions described above can be at least partially performed by one or more hardware logic components. For example, without limitation, exemplary types of hardware logic components that can be used include: a field programmable gate (FPGA), an application specific integrated circuit (ASIC), an application specific standard product (ASSP), a system on chip (SOC), a complex programmable logic device (CPLD), etc.

In the context of the present disclosure, a machine-readable medium can be a tangible medium that can contain or store a program for use by or in connection with an instruction execution system, apparatus or device. The machine-readable medium may be a machine-readable signal medium or a machine-readable storage medium. The machine-readable medium can be, for example, but not limited to, an electronic, magnetic, optical, electromagnetic, infrared, or semiconductor system, apparatus or device, or any suitable combination of the above. More specific examples of the machine-readable storage medium include an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination of the above.

An embodiment of the present disclosure further provides a computer program, where the computer program is stored in a readable storage medium, at least one processor of an electronic device can read the computer program from the readable storage medium, and the at least one processor executes the computer program, to cause the electronic device to perform the method according to any one of the above embodiments.

According to one or more embodiments of the present disclosure, [Example 1] provides a method for displaying an activity entrance, applied to a client, where the method includes:

receiving an activity promotion video, playing the activity promotion video, and pausing the activity promotion video when the playing reaches a preset image frame;

switching from a current playing interface to a mask interface, and displaying the activity entrance in the mask interface.

According to one or more embodiments of the present disclosure, [Example 2] provides a method for displaying an activity entrance, further including:

in an embodiment, after the displaying the activity entrance in the mask interface, the method includes:

in response to a trigger instruction of the activity entrance, switching from the mask interface to an activity interface; or, in response to an exit instruction of the mask interface, exiting the mask interface.

According to one or more embodiments of the present disclosure, [Example 3] provides a method for displaying an activity entrance, further including:

in an embodiment, after the switching from the mask interface to the activity interface, the method further includes:

in response to an exit instruction of the activity interface, exiting the activity interface; or, in response to an exit instruction of the activity interface, displaying a pop-up window interface that displays an activity interface route;

in response to a confirm instruction of the activity interface route, closing the pop-up window interface and exiting the activity interface.

According to one or more embodiments of the present disclosure, [Example 4] provides a method for displaying an activity entrance, further including:

in an embodiment, after the switching from the mask interface to the activity interface, the method further includes:

in response to an edit instruction of a comment area in the activity interface, generating comment content in the comment area, or generating interaction content for existing comment content in the comment area; or, in response to a trigger instruction of a sub-activity interface link in the activity interface, switching from the activity interface to a sub-activity interface.

According to one or more embodiments of the present disclosure, [Example 5] provides a method for displaying an activity entrance, further including:

in an embodiment, after the exiting the mask interface, or after the exiting the activity interface, the method further includes:

playing another received video other than the activity promotion video; or, continuing playing the activity promotion video, until the activity promotion video ends.

According to one or more embodiments of the present disclosure, [Example 6] provides a method for displaying an activity entrance, further including:

in an embodiment, in a process of the continuing playing the activity promotion video, the method further includes:

in response to a video switch instruction, switching from the activity promotion video to the another video other than the activity promotion video, and playing the another video.

According to one or more embodiments of the present disclosure, [Example 7] provides a method for displaying an activity entrance, further including:

in an embodiment, in a process of the continuing playing the activity promotion video, the method further includes:

keeping displaying an activity pendant in a preset area of the activity promotion video.

According to one or more embodiments of the present disclosure, [Example 8] provides a method for displaying an activity entrance, further including:

in a process of playing the activity promotion video again, determining whether a trigger instruction of the activity pendant is received;

if yes, switching from the current playing interface to the activity interface;

if no, playing the activity promotion video, until the activity promotion video ends.

According to one or more embodiments of the present disclosure, [Example 9] provides a method for displaying an activity entrance, further including:

in an embodiment, the client is applied to a scenario of pushing video-type feed streams; correspondingly, the activity promotion video is pushed by a server according to activity preference characteristics of the client.

According to one or more embodiments of the present disclosure, [Example 10] provides a method for displaying an activity entrance, further including:

in an embodiment, the displaying the activity entrance in the mask interface includes:

letting a pop-up window interface containing an entrance prop entering the mask interface with a preset animation effect, and making the pop-up window interface stay in a center position of the mask interface.

According to one or more embodiments of the present disclosure, [Example 11] provides a method for displaying an activity entrance, further including:

in an embodiment, the activities include at least one of the following: getting red envelopes, getting virtual prizes, getting physical prizes, product promotion and so on.

According to one or more embodiments of the present disclosure, [Example 12] provides a method for displaying an activity entrance, further including:

in an embodiment, a generation manner of the trigger instruction of the activity entrance includes:

generating the trigger instruction of the activity entrance according to a user operation acted on an entrance prop or a guiding text of the activity entrance; or, generating the trigger instruction of the activity entrance according to a user operation acted on a random area other than a navigation bar area and an exit control area in the mask interface.

The above description is only preferred embodiments of the present disclosure and the description of the applied technical principle. It should be understood by those of ordinary skills in the art, the disclosure scope involved in the present disclosure is not limited to the technical solution formed by the specific combination of the above technical features, but also covers other technical solutions formed by any combination of the above technical features or their equivalent features without departing from the above disclosed concept. For example, technical solutions formed by replacing the above features with (but not limited to) technical features with similar functions disclosed in the present disclosure.

In addition, although various operations are described in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments can also be implemented in a single embodiment in combination. On the contrary, various features described in the context of one single embodiment can also be implemented in multiple embodiments independently or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are only example forms of implementing the claims.

What is claimed is:

1. A method for displaying an activity entrance, wherein the method is applied in a client, and the method comprises:

receiving an activity promotion video, playing the activity promotion video, and pausing the activity promotion video when the playing reaches a preset image frame;

switching from a current playing interface to a mask interface, and displaying the activity entrance in the mask interface;

after the displaying the activity entrance in the mask interface, in response to a trigger instruction of the activity entrance, switching from the mask interface to an activity interface; and after the switching from the mask interface to the activity interface:

in response to a trigger instruction of a sub-activity interface link in the activity interface, switching from the activity interface to a sub-activity interface, in response to an exit instruction of the activity interface, displaying a pop-up window interface that displays an activity interface route, and in response to a confirm instruction of the activity interface route, closing the pop-up window interface and exiting the activity interface;

wherein the displaying the activity entrance in the mask interface comprises letting the pop-up window interface containing an entrance prop enter the mask interface with a preset animation effect, and making the pop-up window interface stay in a center position of the mask interface, wherein the entrance prop is an element model diagram relating to an activity; wherein the preset animation effect is repeatedly performed for several times, and the preset animation effect is one of flying in from the side, appearing from small to large, and appearing from fuzzy to clear;

wherein after the exiting the activity interface, the method further comprises continuing playing the activity promotion video, until the activity promotion video ends;

wherein in a process of continuing playing the activity promotion video, the method further comprises keeping displaying an activity pendant in a preset area of the activity promotion video, wherein the activity pendant is taken as the activity entrance to re-enter the activity interface; and wherein after the keeping displaying the activity pendant in the preset area of the activity promotion video, in response to the client playing the activity promotion video again, the method further comprises playing the activity promotion video without pausing and without switching from the current playing interface to the mask interface when the playing reaches the preset image frame.

2. The method according to claim 1, wherein after the displaying the activity entrance in the mask interface, the method further comprises:
in response to an exit instruction of the mask interface, exiting the mask interface.

3. The method according to claim 2, wherein a generation manner of the trigger instruction of the activity entrance comprises:
generating the trigger instruction of the activity entrance according to a user operation acted on the entrance prop or a guiding text of the activity entrance; or,
generating the trigger instruction of the activity entrance according to a user operation acted on a random area other than a navigation bar area and an exit control area in the mask interface.

4. The method according to claim 1, wherein after the switching from the mask interface to the activity interface, the method further includes:
in response to an edit instruction of a comment area in the activity interface, generating comment content in the comment area, or generating interaction content for existing comment content in the comment area;
wherein the sub-activity interface is an interface to invite friends to participate in an activity.

5. The method according to claim 1, wherein in the process of continuing playing the activity promotion video, the method further comprises:
in response to a video switch instruction, switching from the activity promotion video to another video other than the activity promotion video, and playing the another video.

6. The method according to claim 1, further comprising:
in a process of playing the activity promotion video again, determining whether a trigger instruction of the activity pendant is received;
in response to determining that the trigger instruction of the activity pendant has been received, switching from the current playing interface to the activity interface;

in response to determining that the trigger instruction of the activity pendant has not been received, playing the activity promotion video, until the activity promotion video ends.

7. The method according to claim 1, wherein the activity promotion video is pushed by a server according to activity preference characteristics of the client.

8. The method according to claim 1, wherein activities comprise at least one of the following: getting red envelopes, getting virtual prizes, getting physical prizes, product promotion.

9. The method according to claim 1,
wherein video content of the activity promotion video carries an activity title, an activity award content, and manners to obtain awards, and
wherein the activity interface route is a manner for re-entering the activity.

10. The method according to claim 1, wherein the switching from the current playing interface to the mask interface comprises superposing the mask interface on the current playing interface, such that an information of the activity promotion video is fuzzified.

11. An apparatus for displaying an activity entrance, wherein the apparatus is integrated in a client, and the apparatus comprises:
one or more processors, and
a storage apparatus, configured to store one or more programs,
wherein when the one or more programs are executed by the one or more processors, the one or more processors are caused to:
receive an activity promotion video, play the activity promotion video, and pause the activity promotion video when the playing reaches a preset image frame;
switch from a current playing interface to a mask interface, and display the activity entrance in the mask interface;
after displaying the activity entrance in the mask interface, in response to a trigger instruction of the activity entrance, switch from the mask interface to an activity interface;
after switching from the mask interface to the activity interface:
in response to a trigger instruction of a sub-activity interface link in the activity interface, switch from the activity interface to a sub-activity interface,
in response to an exit instruction of the activity interface, displaying a pop-up window interface that displays an activity interface route, and
in response to a confirm instruction of the activity interface route, closing the pop-up window interface and exiting the activity interface;
let the pop-up window interface containing an entrance prop enter the mask interface with a preset animation effect, and make the pop-up window interface stay in a center position of the mask interface, wherein the entrance prop is an element model diagram relating to an activity; wherein the preset animation effect is repeatedly performed for several times, and the preset animation effect is one of flying in from the side, appearing from small to large, and appearing from fuzzy to clear;
after exiting the activity interface continue playing the activity promotion video, until the activity promotion video ends;

wherein in a process of continuing playing the activity promotion video, the one or more processors is further configured to keep display an activity pendant in a preset area of the activity promotion video, wherein the activity pendant is taken as the activity entrance to re-enter the activity interface; and wherein after the keep displaying the activity pendant in the preset area of the activity promotion video, in response to the client playing the activity promotion video again, the one or more processors is further configured to play the activity promotion video without pausing and without switching from the current playing interface to the mask interface when the playing reaches the preset image frame.

12. The apparatus according to claim 11, wherein after the one or more processors displays the activity entrance in the mask interface, the one or more processors is further configured to:

in response to an exit instruction of the mask interface, exit the mask interface.

13. The apparatus according to claim 11, wherein after the one or more processors switches from the mask interface to the activity interface, the one or more processors is further configured to:

in response to an edit instruction of a comment area in the activity interface, generate comment content in the comment area, or generate interaction content for existing comment content in the comment area;

wherein the sub-activity interface is an interface to invite friends to participate in the activity.

14. The apparatus according to claim 11, wherein in the process of continuing playing the activity promotion video, the apparatus is further configured to:

in response to a video switch instruction, switch from the activity promotion video to another video other than the activity promotion video, and play the another video.

15. A non-transitory storage medium comprising computer-executable instructions, wherein when the computer-executable instructions are executed by a computer processor, the following method is performed:

receiving an activity promotion video, playing the activity promotion video, and pausing the activity promotion video when the playing reaches a preset image frame; and switching from a current playing interface to a mask interface, and displaying an activity entrance in the mask interface;

after the displaying the activity entrance in the mask interface, in response to a trigger instruction of the activity entrance, switching from the mask interface to an activity interface;

after the switching from the mask interface to the activity interface:

in response to a trigger instruction of a sub-activity interface link in the activity interface, switching from the activity interface to a sub-activity interface, in response to an exit instruction of the activity interface, displaying a pop-up window interface that displays an activity interface route, and in response to a confirm instruction of the activity interface route, closing the pop-up window interface and exiting the activity interface;

wherein the displaying the activity entrance in the mask interface comprises letting the pop-up window interface containing an entrance prop enter the mask interface with a preset animation effect, and making the pop-up window interface stay in a center position of the mask interface, wherein the entrance prop is an element model diagram relating to an activity; wherein the preset animation effect is repeatedly performed for several times, and the preset animation effect is one of flying in from the side, appearing from small to large, and appearing from fuzzy to clear;

wherein after the exiting the activity interface, the method further comprises continuing playing the activity promotion video, until the activity promotion video ends;

wherein in a process of continuing playing the activity promotion video, the method further comprises keeping displaying an activity pendant in a preset area of the activity promotion video, wherein the activity pendant is taken as the activity entrance to re-enter the activity interface;

wherein after the keeping displaying the activity pendant in the preset area of the activity promotion video, in response to a client playing the activity promotion video again, the method further comprises playing the activity promotion video without pausing and without switching from the current playing interface to the mask interface when the playing reaches the preset image frame.

* * * * *